Nov. 11, 1969   R. L. CARLSTEDT   3,477,490

TIRE STUD

Filed Aug 16, 1967

INVENTOR.
RAGNAR L. CARLSTEDT
BY 3,477,490
TIRE STUD
Ragnar L. Carlstedt, Valley Heights, Pa., assignor to Kennametal Inc., Latrobe, Pa., a corporation of Pennsylvania
Filed Aug. 16, 1967, Ser. No. 661,000
Int. Cl. B60c 11/16
U.S. Cl. 152—210                   12 Claims

ABSTRACT OF THE DISCLOSURE

The invention relates to a tire stud for being inserted into a tire tread to increase the traction thereof on a roadway in which the stud is made up of a metal body and a carbide pin in the body and wherein the body is made of a sintered powdered metal material having a relatively low heat conductivity.

---

The present invention is concerned with tire studs of a generally known type having a metal body with a head at one end and a carbide pin projecting from the other end.

Tire studs of the nature with which the present invention is concerned are inserted in tire treads head end foremost so the carbide pin end will project slightly therefrom so that as the tire rolls on a roadway the outer ends of the studs will engage the roadway and increase the traction of the tire on the roadway. Such studs have proved to be extremely valuable in increasing the degree of traction with which a tire engages a slippery surface, particularly a surface covered with ice or hard packed snow.

While extensive tests and experimentation have shown that the studs have merit with respect to increasing the traction of the tire on the roadway, certain problems have also presented themselves in connection with the use of the studs. One of the problems that arises when using studs is related to the fact that, in most conventional driving, even in the type of weather where hard packed snow and ice are encountered, a large percentage of the roadways are free of snow and ice and dry due to the use of snow removal equipment and to extensive driving thereon.

Thus, while the studs in the tires are of great benefit on certain portions of the roads normally covered, considerable parts of the roads, in most cases, are in the form of clean dry pavement where the studs are of no particular benefit and are, in fact, not even needed. When a studded tire is driven on a clean, dry roadway, there is some tendency, due to the slipping of the studs on the road surface in normal operation and due to tire slippage during acceleration and braking, to develop considerable heat in the stud and, particularly, in the central hard carbide pin in the stud.

The development of heat within the stud is associated, in particular, with acceleration and deceleration of the vehicle on which the tire is mounted but heat will also be developed in the stud as the tire rolls in a normal manner on a clean dry road surface. In extreme conditions, it is believed that the heat developed within the pin of the stud may reach several hundred degrees Fahrenheit, even up to 900 degrees F. in extreme conditions.

In the normal stud, wherein the stud body is solid steel or iron, the heat conductivity of the stud body is quite high and, if it is assumed that the major portion of the heat is developed in the pin, it will be evident that when a temperature of 900 degrees F. is developed in the pin, the heat will pass into the body and the entire stud will tend to assume an elevated temperature, even taking into account the heat capacity of the body. The tread rubber surrounding the stud is a relatively poor conductor of heat and forms a heat insulating environment for the stud and it follows that the rubber immediately surrounding the stud will also tend to assume an elevated temperature. Furthermore, the head end of the stud is near the cords in the tire body and this region of the tire body, in normal operation, becomes quite warm due to the flexing of the cord and rubber and this region of the tire can, therefore, become quite hot.

The nature of the rubber and rubber-like compounds that are used for tire treads is such that at above about 300 degrees F. there is some tendency toward accelerated reversion, or oxidation, of the rubber, or of the rubber-like compounds, which is objectionable because the rubber surrounding the stud will deteriorate under these circumstances thereby permitting the stud to become loose in the tread. Loosening of the stud in the tread can lead to loss of the stud and will, in any case, reduce the efficiency of engagement of the stud with the roadway and, furthermore, reduces the life of the studded tire.

Attempts have been made to reduce the maximum temperature at the interface of the stud and the tire by making the stud body of plastic or by embedding the stud in a body of plastic conforming in shape to the stud. These attempts have not heretofore been successful because, with a stud body formed of plastic, the high temperature developed in the pins causes softening or deterioration of the plastic and the pins can be lost from the plastic body. When the pin is mounted in a small metal body or holder and is imbedded in a body of plastic, substantially the same disadvantageous results is obtained because the pin and the metal retaining body rises to such a temperature that they become loose in the plastic or cause deterioration of the plastic. This comes about because the heat conductivity of plastic is so low that it forms a heat barrier around the metal of the stud. The plastic thus can easily be heated to the temperature at which it commences to deteriorate. Also, if the plastic is thinner in one region than in another, as could easily occur with a thinly coated stud, the heat of the metal parts of the stud will produce a hot spot at the thinner region which will, in turn, produce deterioration of the adjacent tread material.

The present invention attacks the problem of deterioration of the tread material due to high temperature at the interface of the stud and the tire tread material in a novel manner by forming the stud body of a material which has a relatively low heat conductivity. Inasmuch as the stud, in normal operating conditions, spends about nine-tenths of the time in the atmosphere, there is a substantial loss of heat from the stud to the atmosphere, so that by reducing the rate at which the heat transfers from the pin through the stud body into the tread material, a greater opportunity is afforded for the heat to dissipate to the atmosphere and, in this manner, to reduce the temperature at the interface between the stud and the tread material.

Tests and experimentation have shown that a stud body of stainless steel, in particular, sintered stainless steel powder, achieves the beneficial results referred to above. In particular, it has been found that the stud bodies of stainless steel and sintered stainless steel powder have merit in this respect because the heat conductivity of stainless steel is on the order of about 4.0 to 5.5 which is considerably lower than the normal heat conductivity of a conventional solid 1% carbon steel body which is on the order of about 26. The units of the heat conductivity referred to is B.t.u./ft., H.R., ° F./sq. ft.

A particularly effective stainless steel contains about 13% chromium and 12% nickel. In addition, stainless steel is resistant to rust and corrosion and wear which are also factors that influence stud life and efficiency. The stainless steel bodies thus offer the advantage of long life, resistance to corrosion, reduced heating of the tire because of the lower heat conductivity of the stud body, while the stud bodies are, furthermore, capable of being made at high speed by powder metallurgy techniques.

It is further contemplated to employ hardenable stainless steel powders which, while having a higher heat conductivity than the stainless steel powders first referred to, are still far less conductive than solid steel or iron or even sintered steel or iron powders. The hardenable stainless steel bodies, when hardened, have longer wearing qualities and are thus of advantage for truck tires and other severe usage locations.

The exact nature of the present invention will be more clearly comprehended upon reference to the following detailed specification taken in connection with the accompanying drawings in which.

Figure 1:
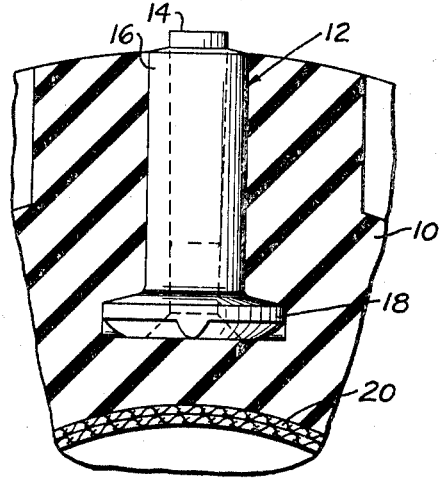
FIGURE 1 is a somewhat schematic sectional view showing a tire stud according to the present invention mounted in the tread of a tire.

Referring to the drawings somewhat more in detail, in FIG. 1, 10 indicates the rubber or rubber-like tread of a tire. The tire has imbedded therein a stud 12 which consists of a central hard cemented carbide pin 14, a metal body having a tubular shank portion 16, and a single head 18 on the inner end of the stud. The studs are inserted in the tread of the tire by drilling or molding holes in the tire tread which extend substantially radially of the tire and which terminate within the tread short of the fabric layers 20 at the inner side of the tread, and which holes are smaller in diameter than the diameter of the shank portions 16 of the stud. The studs are then inserted in the holes by pressing them therein head end foremost, or by expanding the holes with a suitable tool and inserting the studs into the holes and then withdrawing the tool so that the rubber collapses around the stud in supporting relation thereto.

Figure 2:
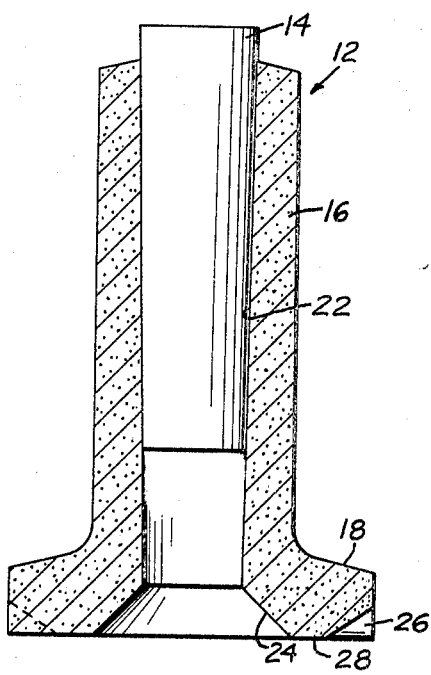
FIGURE 2 is a vertical sectional view through a stud according to the present invention drawn at enlarged scale.

FIGURE 2 shows the stud drawn at enlarged scale and showing that the hole or bore 22 in which pin 14 is placed can extend completely through the stud body. Pin 14 is advantageously tapered and is inserted into the bore 22 small end foremost. One or the other of the inner end of the pin and the outer end of the bore could be provided with a tapered pilot region to assist in inserting the pins into the bores. The pin and bore are of such size that the pin has an interference fit with bore 22 along the entire extent of the bore which the pin extends. By so mounting the pin in the bore, the impacting of the pin against the roadway tends to maintain it tight in the bore and the pin is firmly supported throughout its entire life and remains effective almost completely to the inner end thereof without being lost from the stud body.

The provision of the bore 22 extending completely through the stud body also permits of flaring the head end of the bore as at 24 to provide a cavity in the head of the stud into which tread material will extrude somewhat when the pin is pressed against a roadway thereby giving the stud a high degree of resilience in the tire tread so that it is always pressed outwardly toward the roadway with sufficient force that it will bite into ice or hard snow while at the same time permitting the stud to be pressed into the tire tread while the tire is running on a clean dry roadway.

The provision of the cavity in the head of the stud also permits the head 18 to be made of a diameter such that there is virtually no possibility of the stud accidentally being thrown out, or dropping out, of the tire tread. By balancing the diameter of the head against the size of the cavity in the head, the stud can be made to have the proper degree of resilience in the tire tread and also the properly high degree of resilience in the tire tread and also the properly high degree of resistance to pull out from the tire tread.

Figure 3:
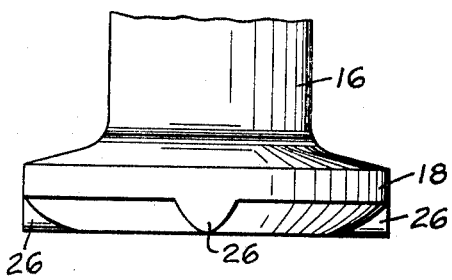
FIGURE 3 is a side elevation of the head end of the stud.
Figure 4:
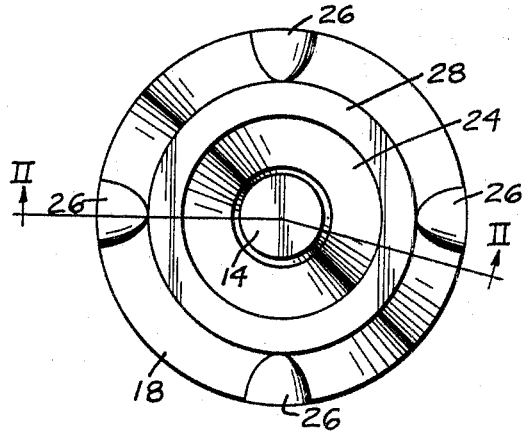
FIGURE 4 is a bottom plan view of the stud.

As will be seen in FIGS. 2, 3 and 4, head 18 is provided with lug-like projections 26 extending therefrom which inhibit rotation of the stud in the tire tread when the tire is running on a roadway. Such rotation of the stud is objectionable because grit that may work its way in between the stud and the tire will cause rapid abrasion of the stud body if it tends to rotate in the tire.

Furthermore, head 18 is formed with a flat annular area 28 between the mouth of tapered part 24 of the bore in the stud body and the radially inner ends of projections 26 so that when the stud is placed in a hole in a tire tread, it will have a firm bearing on the bottom of the hole tending to inhibit tilting of the stud in the tire tread. The cavity 24, by receiving tread material extruded upwardly therein when the stud is pushed into the tire, also assists in holding the stud upright in the tire tread.

In the manufacture of the stud according to the present invention, the stud body is pressed to shape from a stainless steel powder and sintered and requires no further work except burnishing to a polished finish, if desired. The separately formed carbide pin is then pressed into the bore in the stud body so as to have the proper projection therefrom and a completed stud ready for installation into a tire tread results.

A particularly advantageous manufacturing technique for certain classes of studs can be followed when the stud bodies are made of a hardenable stainless steel. In the case of such material, following sintering at about 2000° F., the stud bodies are cooled down to about 900° F., or are cooled and then reheated to about 900° F., and are quenched in a quenching medium, such as silicone oil or castor oil. The quenching of the stud bodies hardens them because of the carbon in the powder mixture thus providing the stud with a hard long wearing body. Further, since the bodies are porous, the quenching medium is drawn into the pores of the body as an impregnant and further inhibits corrosion of the body and acts as a lubricant when the stud is inserted in a tire tread. Such studs, while the bodies have somewhat higher heat conductivity than the studs first mentioned, are of benefit for use in severe wear locations, such as in truck tires, because the bodies are more wear resistant. The stainless steel powder in this case may contain, for example, about 12% chromium, about 1% manganese, and about 1½% carbon.

The present invention is thus particularly concerned with the forming of a tire stud body from powdered stainless steel and which body may be, when the stainless steel is of a hardenable composition, hardened by quenching in a quenching medium.

What is claimed is:

1. In a tire stud having a body and a hard pin in the body and projecting from one end of the body, said stud being adapted to be mounted in a hole provided therefor in a tire tread, the improvement which comprises; forming said body of sintered compacted stainless steel powder whereby said body has a coefficient of heat conductivity substantially lower than that of solid metal.

2. A tire stud according to claim 1 in which said metal powder is non-hardenable stainless steel powder.

3. A tire stud according to claim 1 in which said metal powder is hardenable stainless steel powder and the compacted and sintered body is hardened.

4. A tire stud according to claim 3 in which said body is air hardened.

5. A tire stud according to claim 3 in which said body is hardened by quenching in a liquid quenching medium.

6. A tire stud according to claim 5 in which said quenching medium has the property of inhibiting reversion of rubber and rubber-like materials.

7. A tire stud according to claim 6 in which said quenching medium also has the property of lubricating the stud as it is being installed in a tire tread.

8. A tire stud having a sintered powdered metal body comprising a shank and a head, a bore extending axially completely through the body, an integral flange on one extreme end of the shank forming the said head for the stud, a hard pin extending into and fixed in the bore in the shank from the end thereof opposite said head and projecting from the shank end of the bore and terminating in the bore short of the head end of the bore, said bore having a wide angle taper at the head end thereof, said head on the side facing away from said shank having a wide angle taper on the peripheral portion thereof and an annular flat region extending between the taper in the end of the bore and the taper on the head, and circumferentially spaced radial projections on said head upstanding from the said taper thereon co-planar at their axially outer ends with said annular region and at their radially outer ends with the periphery of said head.

9. A tire stud according to claim 8 in which said bore tapers inwardly slightly from the head end thereof toward the outer end thereof and said pin is tapered and is press fitted into said bore small end foremost and has an interference fit with said bore throughout the length of the pin that is in the bore.

10. A tire stud according to claim 9 in which said head is substantially flat on the side toward the shank and curves upwardly at the center to merge with said shank, said head having a short cylindrical peripheral portion leading from the flat shank side of the head to the taper on the side of the head facing away from said shank.

11. A tire stud according to claim 9 in which said powder is stainless steel power.

12. A tire stud according to claim 9 in which said powder is hardenable stainless steel powder.

References Cited

UNITED STATES PATENTS

| 3,186,466 | 6/1965 | Keinanen | 152—210 |
| 3,301,300 | 1/1967 | Natter | 152—210 |

ARTHUR L. La POINT, Primary Examiner

C. B. LYON, Assistant Examiner